UNITED STATES PATENT OFFICE.

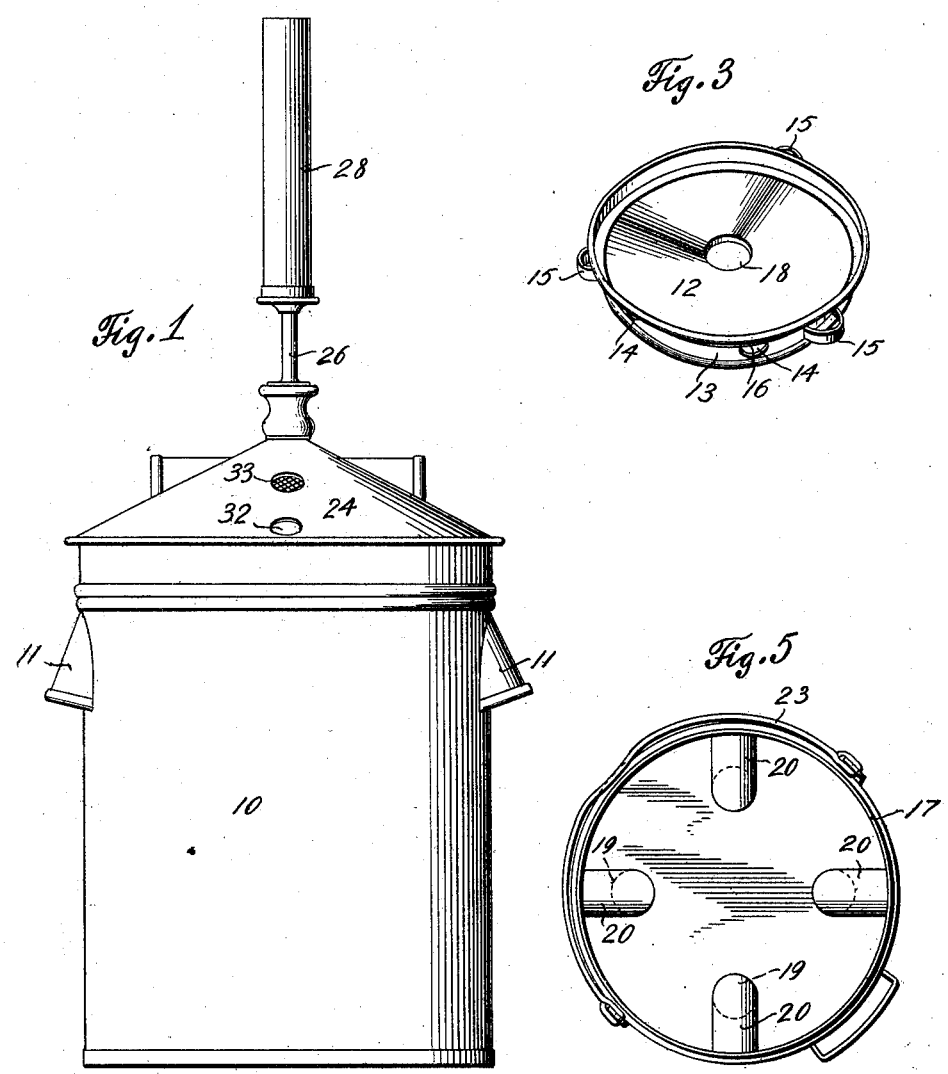

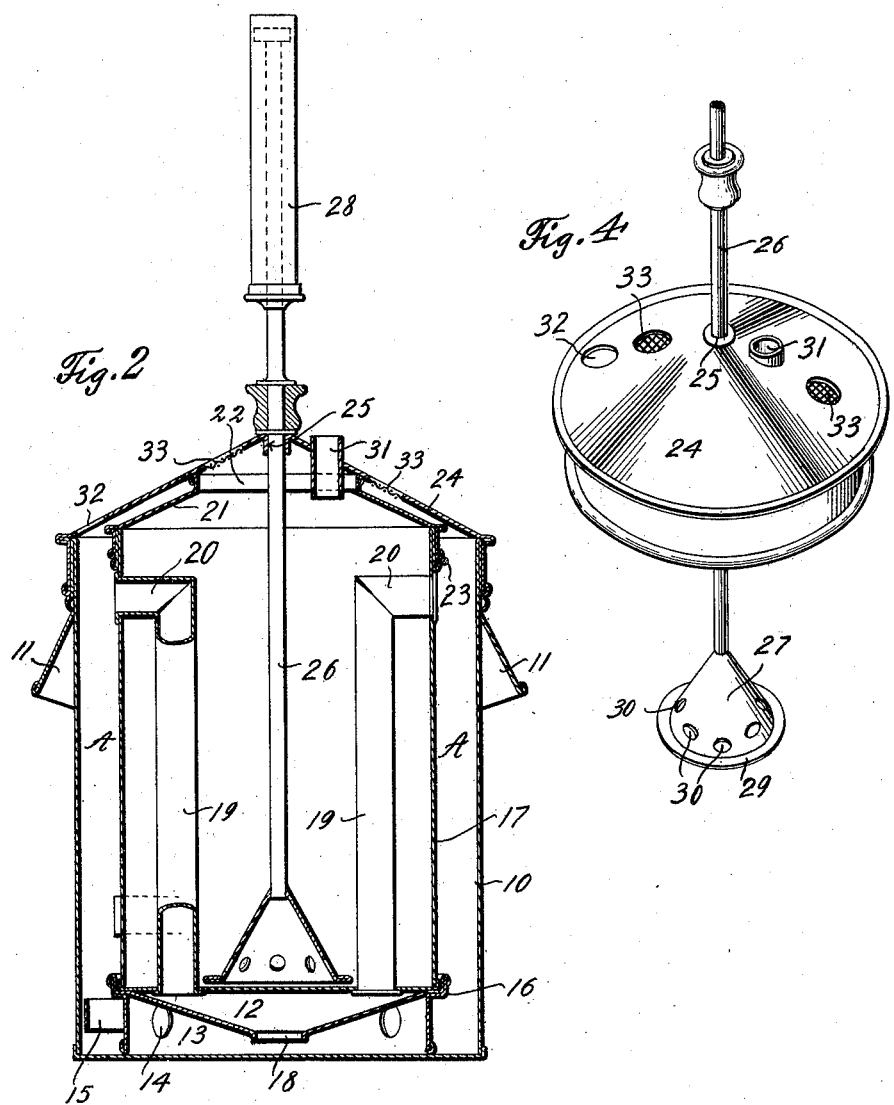

JAMES M. BURNAP, OF FREEPORT, PENNSYLVANIA, ASSIGNOR OF ONE-HALF TO MARGARET ZITAH WALSH AND ONE-SIXTH TO BERNARD WAY, BOTH OF FREEPORT, PENNSYLVANIA.

PASTEURIZER.

985,139.  Specification of Letters Patent.  Patented Feb. 28, 1911.

Application filed April 16, 1910.  Serial No. 555,835.

*To all whom it may concern:*

Be it known that I, JAMES MADISON BURNAP, a citizen of the United States, residing at Freeport, in the county of Armstrong and State of Pennsylvania, have invented certain new and useful Improvements in Pasteurizers, of which the following is a specification.

This invention has reference to pasteurizers for milk and is designed particularly to construct a device of this nature wherein the milk is heated to a high degree of temperature by the circulation of heated water through the same, air being injected into the milk while the same is thoroughly heated and expanded, thereby killing all bacteria and purifying the milk.

It also contemplates the construction of a device of this nature wherein the milk is prevented from being scorched by the elevation of the receptacle containing the same from the bottom of the vessel in which the water is heated.

With the above and other objects in view, this invention consists in the construction, combination, and arrangement of parts all as hereinafter more fully described, claimed and illustrated in the accompanying drawings, wherein:

Figure 1 is a side elevation of a pasteurizer embodying the present invention; Fig. 2 is a central vertical section of the same; Fig. 3 is a perspective view of the false bottom resting on the base of the outer vessel or receptacle; Fig. 4 is a similar view of the cover of the outer receptacle, illustrating the agitator and oxygenator carried thereby; Fig. 5 is a plan view of the inner receptacle.

The present invention resides in the provision of an outer receptacle provided with a false bottom, said false bottom supporting an inner receptacle which is adapted to contain milk while the space between said inner and outer receptacles forms a water space. The inner receptacle is provided with a series of circulating tubes on the interior thereof which extend from the upper end of said receptacle to the base thereof, and open at each extremity into the water space. Thus it will be seen that upon placing the device on the stove, the heat imparted to the water will cause the same to rise between said receptacles and pass through the circulating tubes, thus heating the milk and causing the same to slightly expand. When the milk is in this expanded state, an agitator carried by the cover of the outer receptacle is moved vertically, and by such motion, an air pump carried at the outer extremity of the agitator rod forces air or oxygen into the milk, circulating the former through the latter, thereby killing all bacteria and removing any impurities which may occur in the milk. The cover carrying the oxygenator is provided with screened openings for the removal of impurities which may pass off as gases, and also with the openings whereby the temperature of the water and milk in the receptacles may be tested.

Referring more particularly to the drawings, 10 indicates an outer vessel or receptacle, said vessel being provided with the usual handles 11 and adapted, when the device is in use, to be placed over a fire, thus heating all liquids contained therein to a boiling point.

To prevent the milk being pasteurized from scorching, or overheating, a removable false bottom 12 rests on the inner side of the bottom of the outer vessel 10, said false bottom being concaved and supported from the bottom of the outer receptacle by the lip 13, said lip being pierced by a plurality of spaced openings 14 and provided with the severally spaced handles 15. A retaining bead 16 projects upwardly from said false bottom and provides a means whereby the inner vessel or receptacle 17 may be retained on said false bottom. A centrally disposed opening 18 is formed in the false bottom 12 and provides a means whereby the water delivered from the circulating tubes of the inner vessel 17 may pass through said false bottom to be reheated, after which it is forced through the opening 14 in the supporting lip 13.

The inner vessel 17 is supported by the retaining bead 16 and forms in combination with the outer receptacle 10 a water space designated as A. A plurality of circulating tubes 19 extend from the upper end of said receptacle to the bottom thereof and are provided at their upper terminals with the elbows 20 which open into the water space A, the lower terminals of said circulating tubes connecting with the space between the false bottom 12 and the bottom of the vessel 17. From this it will be understood that when the water contained in the water space A is heated to a boiling point, it will enter the circulating tubes 19 through the elbows 20 and be cooled therein by the milk contained in the vessel 17, then passing to the false bottom, through the central opening 18 thereof, after which it is heated and forced through the spaced openings 14 and into the water space, the operation being continued indefinitely.

A cover 21 is provided for the inner receptacle 17 and has the centrally disposed opening 22 through which the agitator hereinafter more fully described operates, and through which the gas formed by the bacteria and impurities passes. The vessel 17 is also provided with a bail 23 which facilitates the removal of the inner receptacle from the outer.

A lid 24 is provided for the outer receptacle 10, said lid being provided with a centrally disposed orifice 25 through which the tubular oscillator rod 26 carrying at its lower terminal the conical oscillator 27 operates. At the upper extremity of the rod 26 is a pump 28 of any usual construction which is adapted to force air through the tubular rod 26 upon the reciprocation thereof. A flange 29 is provided around the lower edge of the oscillator, above which is a series of openings 30, said bead and openings facilitating the circulation of the milk and the passage of air or oxygen therethrough. Adjacent to the oscillator opening is a similar opening 31 through which a thermometer may be placed to test the temperature of the milk, while adjacent to the edge of the lid 24 is test opening 32 through which a thermometer may be projected to obtain the tempearture of the water. In order to provide a means whereby gases escaping from the milk may pass to the outer atmosphere, a pair of screened openings 33 are disposed on each side of the oscillator and are so located that the gases in the space between the cover 21 and the lid 24 may pass out: however, a portion of said gases condenses and is taken up by the water.

From the foregoing description, it will readily be seen that the water coming directly in contact with the base of the outer receptacle 10 is heated to the boiling point and passes through the circulating tubes 19 and heats the milk, thereby expanding the same. The movement of the oscillator creates a circulation in the milk and during said circulation injects air into the milk, thereby killing all bacteria and forcing all impurities therefrom.

Having thus described my invention, what is claimed as new is:

1. A pasteurizer comprising, in combination, an inner and an outer receptacle, a false bottom spacing said inner receptacle from said outer receptacle, a plurality of vertical circulating tubes in said inner receptacle, water being adapted to pass through said circulating tubes and expand liquid contained in said inner receptacle, and an agitator carrying a pump adapted to impregnate the milk with oxygen.

2. A pasteurizer comprising, in combination, an inner and an outer receptacle, a false bottom spacing said inner receptacle from said outer receptacle, a plurality of vertical circulating tubes in said inner receptacle, water being adapted to pass through said circulating tubes and expand liquid contained in said inner receptacle, a tubular rod reciprocating in said inner vessel, an agitator carried at the lower extremity of said rod, and means whereby oxygen may be forced through said rod into the inner vessel.

3. A pasteurizer comprising, in combination, an inner and an outer receptacle, a false bottom spacing said inner receptacle from said outer receptacle, a plurality of vertical circulating tubes in said inner receptacle, water being adapted to pass through said circulating tubes, and expand liquid contained in said inner receptacle, a tubular rod reciprocating in said inner vessel, an agitator carried at the lower extremity of said rod, and a pump carried at the upper extremity of said rod adapted to force oxygen through said rod and agitator into the inner vessel.

4. A pasteurizer comprising in combination with a vessel, of means movably mounted in said vessel for agitating the contents thereof and means operable by the movement of the agitator for oxygenating the liquid in said vessel.

In testimony whereof I affix my signature in presence of two witnesses.

JAMES M. BURNAP.

Witnesses:
 M. L. PORTER,
 RALPH R. MILLER.

---

Copies of this patent may be obtained for five cents each, by addressing the "Commissioner of Patents, Washington, D. C."